(12) United States Patent
Takezawa et al.

(10) Patent No.: US 10,442,287 B2
(45) Date of Patent: Oct. 15, 2019

(54) FILLING DEVICE

(71) Applicant: Tatsuno Corporation, Tokyo (JP)

(72) Inventors: Masahiro Takezawa, Tokyo (JP); Yuki Terasoma, Tokyo (JP); Kiyoshi Kimura, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 78 days.

(21) Appl. No.: 15/715,671

(22) Filed: Sep. 26, 2017

(65) Prior Publication Data
US 2018/0134147 A1 May 17, 2018

(30) Foreign Application Priority Data
Nov. 16, 2016 (JP) ................. 2016-222998

(51) Int. Cl.
*B60K 15/03* (2006.01)
*F17C 5/00* (2006.01)
*H01M 8/0656* (2016.01)
*H01M 8/04082* (2016.01)

(52) U.S. Cl.
CPC ........... *B60K 15/03* (2013.01); *F17C 5/007* (2013.01); *H01M 8/04201* (2013.01); *H01M 8/0656* (2013.01); *B60K 2015/03315* (2013.01); *F17C 2221/012* (2013.01); *F17C 2225/0123* (2013.01); *F17C 2225/036* (2013.01); *F17C 2265/065* (2013.01); *F17C 2270/0139* (2013.01); *F17C 2270/0178* (2013.01)

(58) Field of Classification Search
CPC .... F17C 5/00; F17C 5/04; F17C 5/007; F17C 2221/012; F17C 2265/065; F16L 37/38; B60K 15/03; B60K 2015/03315

USPC ................................................ 141/301, 350
See application file for complete search history.

(56) References Cited

U.S. PATENT DOCUMENTS

| | | | |
|---|---|---|---|
| 6,343,630 B1 | 2/2002 | Dubinsky | |
| 6,904,944 B2 * | 6/2005 | Satou | F17C 5/00 141/100 |
| 7,028,724 B2 * | 4/2006 | Cohen | F02M 21/0206 141/392 |
| 9,579,970 B2 * | 2/2017 | Esl | F17C 13/04 |
| 2007/0044864 A1 * | 3/2007 | Mathison | B60K 15/04 141/98 |

(Continued)

FOREIGN PATENT DOCUMENTS

EP 1437543 A1 7/2004

OTHER PUBLICATIONS

Extended European Search Report for EP 17197423.1; dated Mar. 3, 2018.

*Primary Examiner* — Timothy L Maust
(74) *Attorney, Agent, or Firm* — Stetina Brunda Garred and Brucker; Mark B. Garred

(57) ABSTRACT

To prevent deterioration of a sealing structure of a filling device to decrease a possibility that hydrogen gas leaks. In filling devices (100, 101) including a storage tank for storing hydrogen fuel and filling nozzles (10, 11) for filling hydrogen from the storage tank through a fuel filling system (dispenser, filling hose and so on) to an in-vehicle hydrogen filling tank mounted on a vehicle, in a pipe joint main body (1) of the filling nozzles (10, 11) is slidably arranged a rod (2: valve rod) having a valve element at its end against an elastic member (3).

10 Claims, 6 Drawing Sheets

(56) References Cited

U.S. PATENT DOCUMENTS

2007/0155224 A1    7/2007  Gerard
2016/0178126 A1*   6/2016  Lee ..................... F17C 11/007
                                                          141/1

* cited by examiner

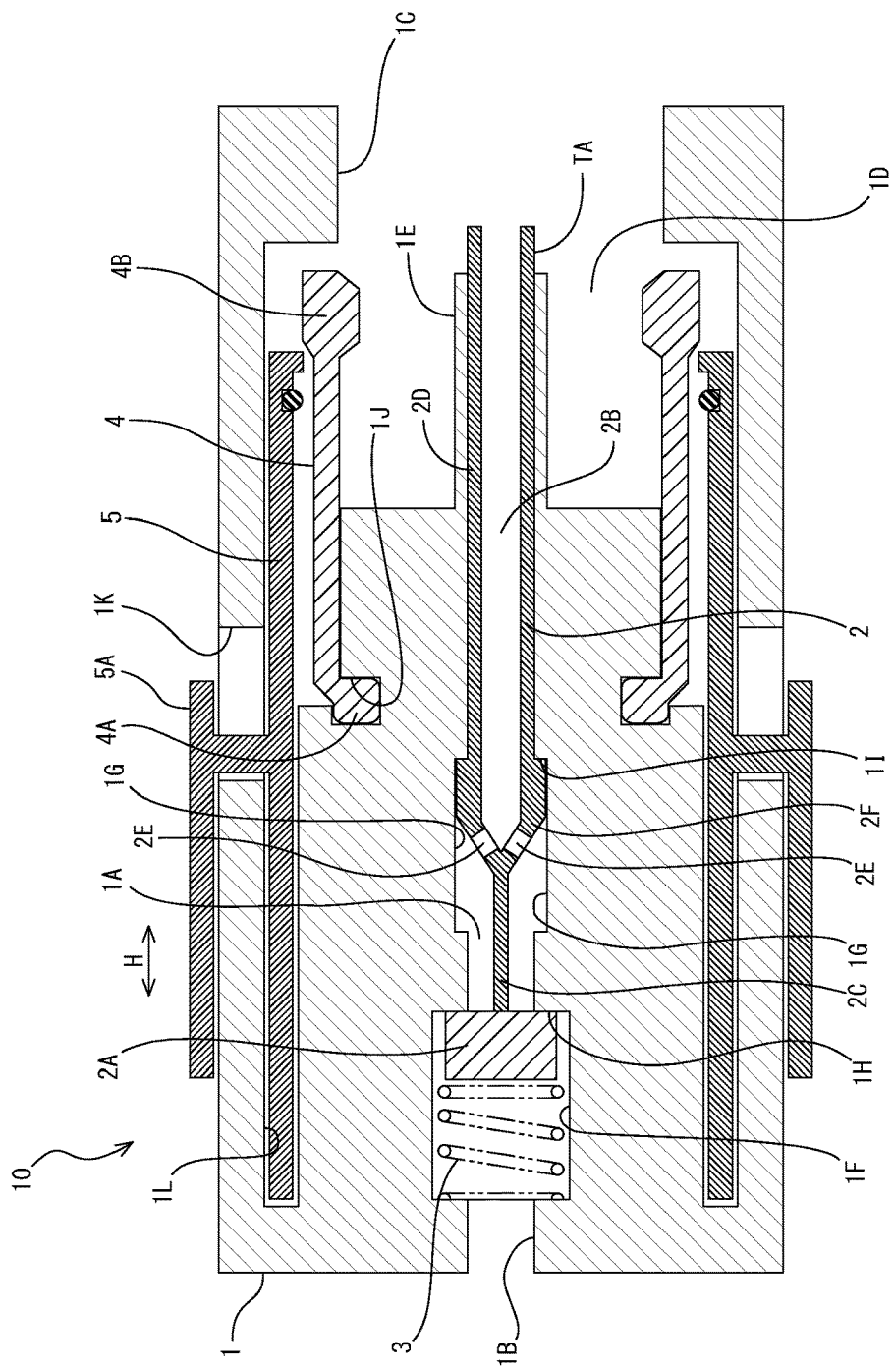
[Fig. 1]

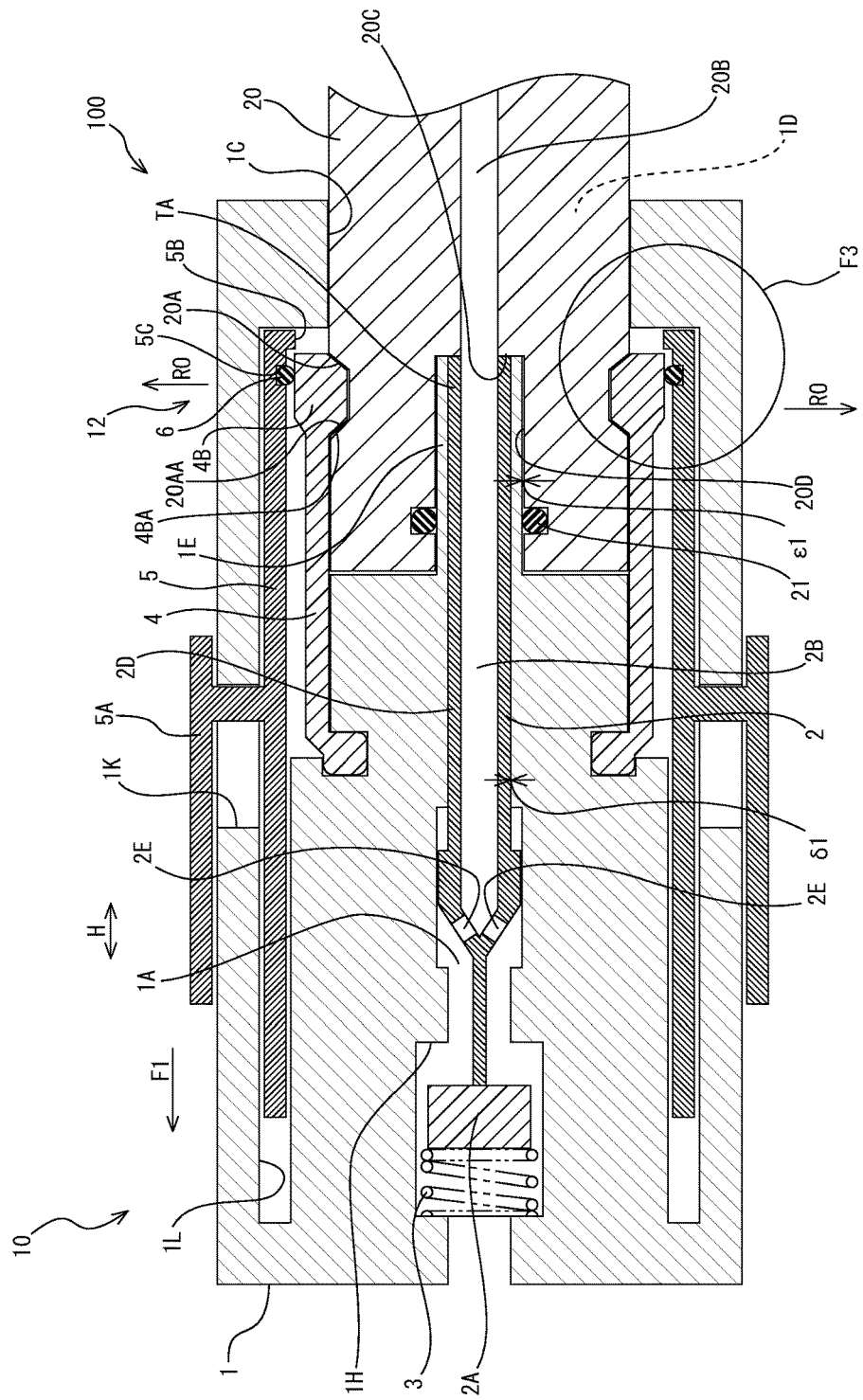
[Fig. 2]

[Fig. 3]
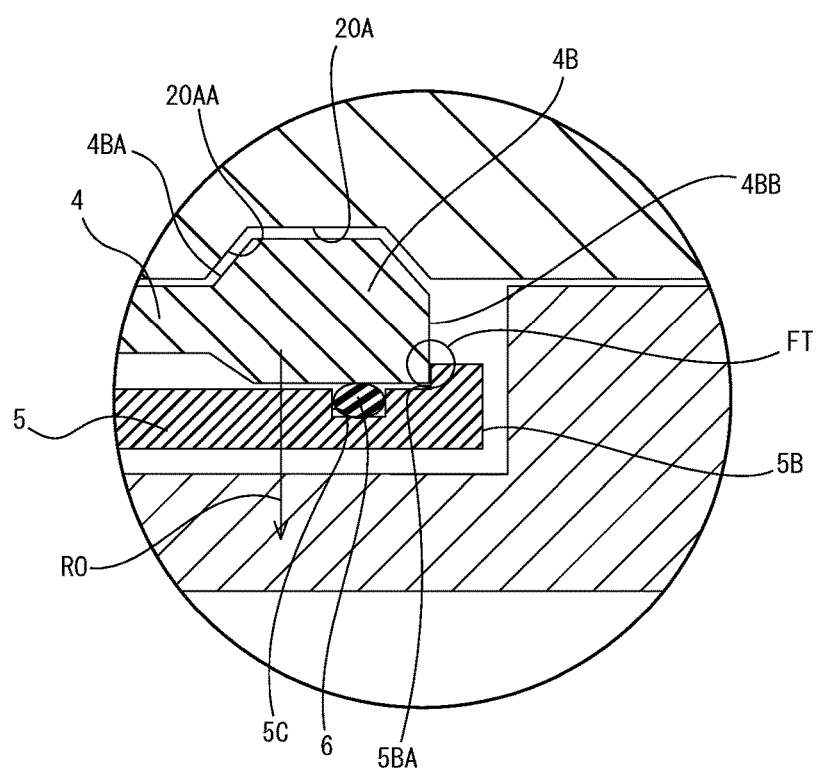

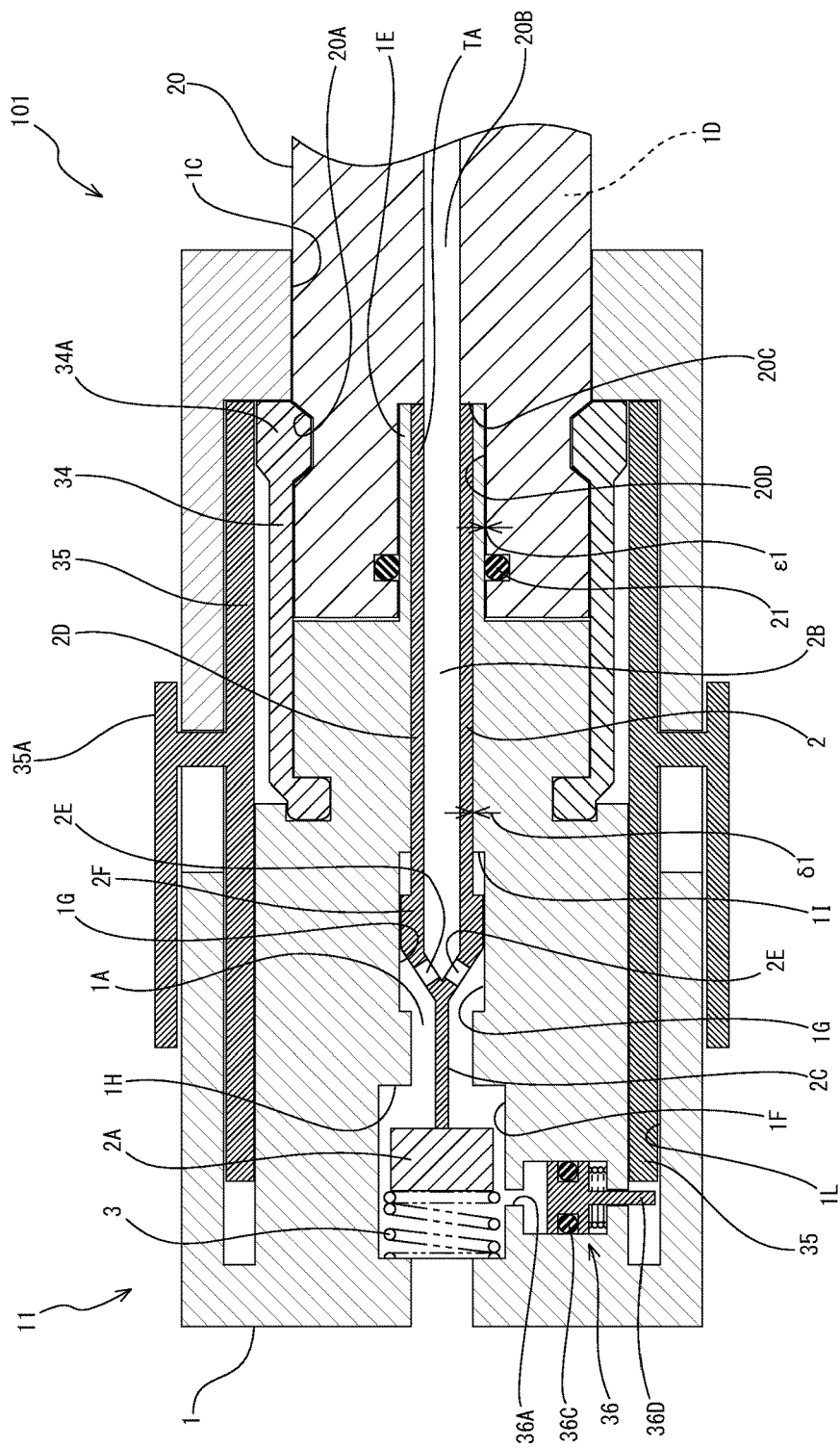
[Fig. 4]

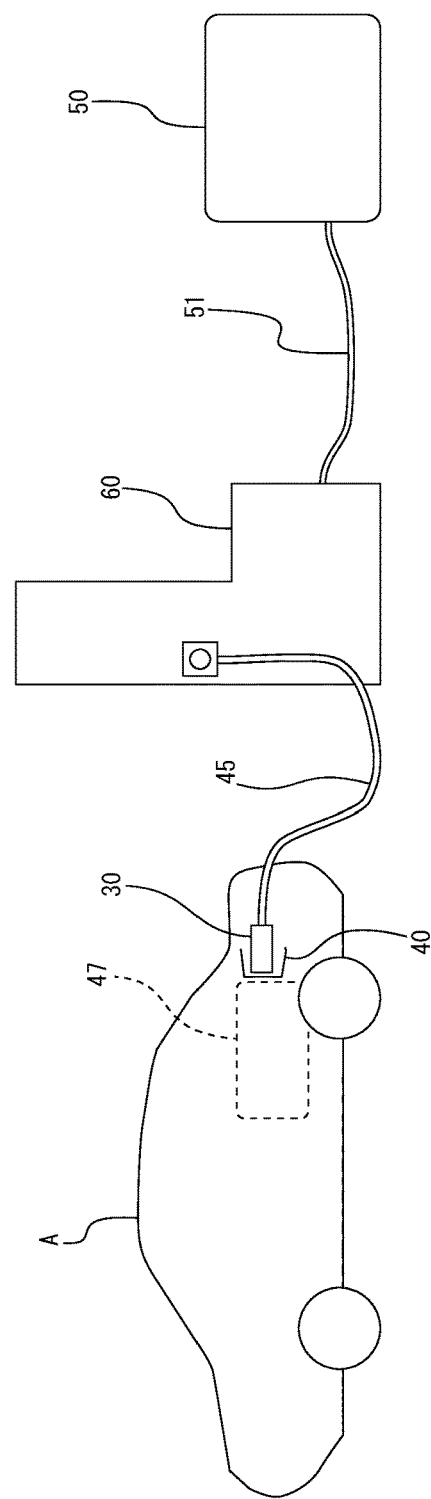
[Fig. 5]

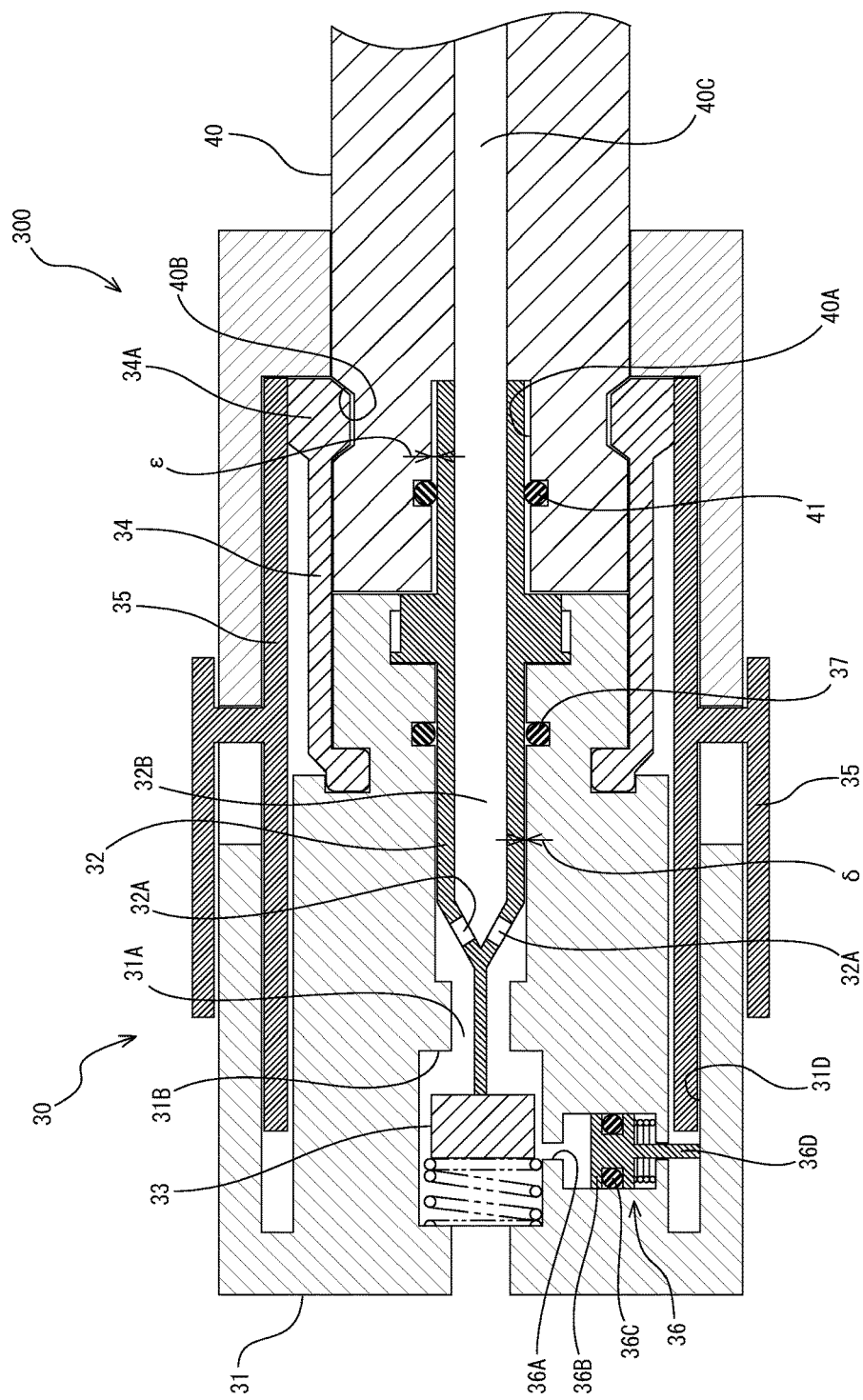
[Fig. 6]

FILLING DEVICE

CROSS-REFERENCE TO RELATED APPLICATIONS

The present application claims priority to Japanese Patent Application No. 2016-222998 filed on Nov. 16, 2016, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a filling device for filling gas such as hydrogen gas used for fuel or the like.

2. Description of the Related Art

For example, to a vehicle using hydrogen as fuel, as shown in FIG. 5, at a hydrogen filling station with a hydrogen storage tank 50 and a fuel filling system having a dispenser 60, a filling hose 45 and so on is filled hydrogen after a nozzle 30 and a receptacle 40 as a vehicle side filling port are connected with each other, and the filling is performed while being controlled depending on the maximum using pressure of a hydrogen tank 47 mounted in a vehicle A. In addition, the numeral 51 shows a piping system for feeding hydrogen from the hydrogen storage tank 50 to the dispenser 60. The present applicant has been already proposed the hydrogen filling device described above (refer to Japanese patent publication No. 2014-109350 gazette for example). The hydrogen filling device is effective, but when hydrogen gas is filled to a vehicle, seal structures are required to make insides of the filling nozzle and the vehicle side filling port airtight state.

For example, in a conventional hydrogen filling device 300 shown in FIG. 6, opening/closing a valve mechanism including a valve element 33 connected to a rod 32 of the nozzle 30 and a valve seat 31B that is a step portion of an in-pipe-joint passage 31A of the nozzle 30 performs filling/stopping of hydrogen gas. To perform filling of hydrogen gas, when a pipe joint 31 of the nozzle 30 and the receptacle 40 as the vehicle side filling port are connected with each other, an end (right end in FIG. 6) of the rod 32 is inserted into an engaging recessed portion 40A on the receptacle 40 side, and a swelling portion 34A at an end of a clutch 34 engages with an engaging channel 40B of the receptacle 40. Since a lever 35 is located radially outside the swelling portion 34A at an end of the clutch 34, unless the lever 35 moves in a direction that being separated from the receptacle 40 (left side in FIG. 6), the clutch 34 cannot be detached from the engaging channel 40B. Then, to prevent the lever 35 from moving in the direction that the lever 35 departs from the receptacle 40 (left side in FIG. 6) at filling, a lever holding mechanism 36 for maintaining a connection state between the pipe joint 31 of the filling nozzle 30 and the receptacle 40 is mounted on the pipe joint 31.

In the conventional technique shown in FIG. 6, the rod 32 is formed to be hollow, so that hydrogen gas passing through the valve mechanism flows in an in-rod passage 32B via openings 32A of the rod 32 to inflow into a passage 40C in the receptacle 40. Then, in order to prevent the hydrogen gas from leaking from a gap δ between a radially outer periphery of the rod 32 and the in-pipe-joint passage 31A, a nozzle side O-ring 37 is mounted in the in-pipe-joint passage 31A as a sealing structure. In addition, in order to prevent hydrogen gas from leaking from a gap £ between an inner wall surface of the engaging recessed portion 40A of the receptacle 40 and an end of the rod 32, a receptacle side O-ring 41 is mounted in the engaging recessed portion 40A as a sealing structure.

However, the sealing structure with the nozzle side O-ring 37 and the receptacle side O-ring 41 becomes a resistance when the pipe joint 31 and the receptacle 40 (vehicle side filling port) are attached to each other and detached from each other. In addition, hydrogen gas is filled to vehicles with the same filling nozzle 30, so that when the number of filling operations increases, the sealing structure deteriorates, and there is a possibility that hydrogen gas leaks. Further, at attaching/detaching of the filling nozzle 30 and the receptacle 40, the rod 32 slides on the nozzle side O-ring 37 and the receptacle side O-ring 41, so that repeating attachment/detachment between the filling nozzle 30 and the vehicle side filling port 40 causes the nozzle side O-ring 37 and the receptacle side O-ring 41 to deteriorate due to the slide of the rod 32 thereon, which may cause leakage of hydrogen gas.

SUMMARY OF THE INVENTION

The present invention has been made in consideration of the above problems in the prior art, and the object thereof is to provide a filling device capable of preventing a seal structure from deteriorating and decreasing a risk that hydrogen gas leaks.

Filling devices (100, 101) according to the present invention include a storage tank for storing hydrogen fuel and filling nozzles (10, 11) for filling hydrogen from the storage tank through a fuel filling system including a dispenser, a filling hose and so on to an in-vehicle hydrogen filling tank mounted on a vehicle, and a rod (2: valve rod) having a valve element at an end, the rod (2) slidably arranged against an elastic member (3) in a pipe joint main body (1) of the filling nozzles (10, 11), and are characterized in that in an end portion of the pipe joint main body (1) on a side of the in-vehicle hydrogen filling tank, an innermost portion for forming surface on which the rod (2) slides projects on the side of the in-vehicle hydrogen filling tank, and when the filling nozzles (10, 11) are connected to a vehicle side filling port (20: receptacle) of the in-vehicle hydrogen filling tank, an outer surface of the projecting portion (1E) of the pipe joint main body (1) contacts an inner surface of the vehicle side filling port (20).

In the present invention, it is preferable that another end of the rod (2) contacts the vehicle side filling port (20) when the filling nozzles (10, 11) contact the vehicle side filling port (20). In addition, it is preferable that a sealing structure is arranged in a portion where an inner periphery of the vehicle side filling port (20) contacts an outer periphery of the projecting portion (1E) of the pipe joint main body (1).

Further, in the present invention, it is preferable that the filling devices (100, 101) include a clutch mechanism (12) for maintaining a connected state between the filling nozzle (10) and the vehicle side filling port (20).

Conventionally, there is a possibility that hydrogen gas leaks from two portions that are a portion between the outer surface of the rod (2) and an inner surface of the pipe joint main body (1) and a portion between the outer surface of the rod (2) and the inner surface of the vehicle side filling port (20). But, with the present invention with the above construction, hydrogen gas being likely to leak from the pipe joint main body (1) side of the outer surface of the rod (2) passes through a portion between the outer surface of the rod (2) and the inner surface of the projecting portion (1E) to join a portion between the outer surface of the rod (2) and the inner surface of the vehicle side filling port (20), so that the number of the sealing structures mounted in the filling nozzles (10, 11) can be decreased, and durability of the filling nozzles (10, 11) is improved. In addition, with the present invention, it is not required to arrange the sealing structure at a portion where the rod (2) slides, so that deterioration of the seal structure due to the slide of the rod (2) can be prevented.

In the present invention, contacting another end of the rod (2) to the vehicle side filling port (20) allows a passage (2B) in the filling nozzles (10, 11) to open, that is, connections of the filling nozzles (10, 11) to the vehicle side filling port (20) enable filling, so it is safe.

In addition, in the present invention, arranging a sealing structure in a portion where an inner periphery of the vehicle side filling port (20) contacts an outer periphery of the projecting portion (1E) of the pipe joint main body (1) can prevent leakage of the hydrogen gas at filling of the hydrogen gas. Further, arranging a sealing structure in a portion of the vehicle side filling port (20) where contacting an outer periphery of the projecting portion (1E) of the pipe joint main body (1) can prevent leakage of the hydrogen gas from a gap $\varepsilon 1$ between the portion of the vehicle side filling port (20) where contacting the outer periphery of the projecting portion (1E) of the pipe joint main body (1) and the outer periphery of the projecting portion (1E) of the pipe joint main body (1).

Here, as shown in FIG. 6, the lever holding mechanism (36) of the filling nozzle (30) according to the conventional technique that maintains a connected state between the filling nozzle (30) and the vehicle side filling port (40) while hydrogen gas is filled is provided with a branched passage (36A) branched from the in-pipe-joint passage (31A), a lever holding slide member (36B) for slidably moving in the branched passage (36A), and a lever holding O-ring (36C). While the hydrogen gas is filled, pressure of the hydrogen gas flowing in the in-pipe-joint passage (31A) acts to the branched passage (36A), which causes the lever holding slide member (36B) to fall in FIG. 6. Falling of the lever holding slide member (36B) causes a rod (36D) of the lever holding slide member (36B) to project into the lever movement passage (31D) to prevent the lever (35) from separating from the vehicle side filling port (40), which maintains a connected state between the filling nozzle (30) and the vehicle side filling port (40). However, repeating attachment/detachment between the filling nozzle (30) and the vehicle side filling port (40) increases the number of slidings of the lever holding slide member (36B) in the branched passage (36A), and the lever holding O-ring (36C) deteriorates to cause hydrogen gas to leak from the branched passage (36A) of the holding mechanism (36).

In contrast, in the present invention, since the filling devices (100, 101) include a clutch mechanism (12) for maintaining a connected state between the filling nozzle (10) and the vehicle side filling port (20), the filling nozzle (10) cannot be detached in a pressurized state. With the clutch mechanism (12), it is unnecessary, for example, to form the branched passage (36A) shown in FIG. 6; the slide member (36B) is not required to slide in the branched passage (36A); and the sealing structure (O-ring 36C) is not required to be provided in the branched passage (36A). As a result, there is no possibility that hydrogen gas leaks from the branched passage (36A) constituting the lever holding mechanism (36) in the prior art.

BRIEF DESCRIPTION OF THE DRAWINGS

FIG. 1 is a cross sectional view showing a pipe joint main body of a filling nozzle according to the first embodiment of the present invention;

FIG. 2 is a cross sectional view showing a condition that the pipe joint in the first embodiment is connected to a vehicle side filling port;

FIG. 3 is an enlarged view showing the part pointed by symbol F3 in FIG. 2;

FIG. 4 is a cross sectional view showing the second embodiment of the present invention;

FIG. 5 is a block diagram showing an outline of a hydrogen filling station; and

FIG. 6 is a cross sectional view of a main part of a hydrogen filling device according to the conventional technique.

DETAILED DESCRIPTION

Hereinafter, embodiments of the present invention will be explained with reference to attached drawings. At first, the first embodiment of the present invention will be explained with reference to FIGS. 1 to 3. In FIG. 1, a filling nozzle 10 fills hydrogen from a hydrogen fuel storage tank not shown through a fuel filling system including a dispenser 60, a filling hose 45 and so on to an in-vehicle hydrogen filling tank. The filling nozzle 10 has a pipe joint main body 1, and on a central portion (a central portion in a vertical direction in FIG. 1) of a hydrogen supply source side (left side in FIG. 1) end of the pipe joint main body 1 is formed a hydrogen introducing port 1B connected to a filling hose side (not shown). Then, on a receptacle side (vehicle side filling port side, right side in FIG. 1) end of the pipe joint main body 1 is formed an opening 1C for inserting a receptacle 20 (shown in FIG. 2) therein. On a hydrogen supply source side (left side in FIG. 1) from the opening 1C in the pipe joint main body 1 is formed a receptacle insertion space 1D, when hydrogen is filled, the receptacle 20 is inserted into the pipe joint main body 1 (left side in FIG. 1) side from the opening 1C, and is situated in the receptacle insertion space 1D.

In FIG. 1, on a central portion in a vertical direction of the pipe joint main body 1 is formed an in-pipe-joint passage 1A, and the in-pipe-joint passage 1A extends from an opening 1B on the hydrogen supply source side to the space 1D on the receptacle side (extends from the left region to the right region in FIG. 1). In addition, on a receptacle (vehicle side filling port) side (right side in FIG. 1) of the pipe joint main body 1 projects a hollow pipe joint middle projection 1E, and the pipe joint middle projection 1E forms an end of the in-pipe-joint passage 1A on the receptacle side.

In the in-pipe-joint passage 1A extending in a horizontal direction in FIG. 1 are formed two enlarged regions that are a valve element accommodating portion 1F and an enlarged diameter portion 1G. In the in-pipe-joint passage 1A is accommodated a rod 2. On an end of the rod 2 is mounted a valve element 2A, and the valve element 2A is accommodated in the valve element accommodating portion 1F of the in-pipe-joint passage 1A. In the valve element accommodating portion 1F, on the hydrogen supply source side (left side in FIG. 1) from the valve element 2A is arranged a spring 3 as an elastic member.

The rod 2 can slide in the in-pipe-joint passage 1A (in a horizontal direction in FIG. 1), and in a condition shown in FIG. 1, that is, in a condition that the pipe joint main body 1 is not connected to the receptacle 20 (shown in FIG. 2), the valve element 2A is urged by an elastically repulsive force of the spring 3 to the receptacle side (right side in FIG. 1), and seats on a valve seat 1H constituted by a step portion at an end (right end portion in FIG. 1) of the valve element accommodating portion 1F. As shown in FIG. 1, in case that the pipe joint main body 1 is not connected to the receptacle 20 (shown in FIG. 2), an end of the receptacle side (right side portion in FIG. 1) of the rod 2 projects on the receptacle side (right side in FIG. 1) from the receptacle side end portion of the pipe joint middle projection 1E. A region that the rod 2 projects from the pipe joint middle projection 1E is shown with the symbol TA. Here, projecting amount (projecting length) of the region TA is determined based on a distance that the rod 2 moves to the left side in FIG. 1 (a direction apart from the receptacle 20) while hydrogen is filled and so on (refer to FIG. 2).

As same as the conventional technique shown in FIG. 6, the rod 2 has a hollow portion, and the hollow portion forms an in-rod passage 2B. The small-diameter portion 2C connected to the valve element 2A and the large-diameter portion 2D forming the hollow portion are connected by a diameter changing portion 2F forming the openings 2E. The diameter changing portion 2F of the rod 2 is accommodated in the enlarged diameter portion 1G of the in-pipe-joint passage 1A. While hydrogen gas is filled (refer to FIG. 2), from a dispenser not shown in FIG. 1 (refer to FIG. 5: arranged in the left side region in FIG. 1) through the valve element 2A into the in-pipe-joint passage 1A flows hydrogen gas, and the hydrogen gas flows in the in-rod passage 2B thought the openings 2E of the diameter changing portion 2F of the rod 2 accommodated in the enlarged diameter portion 1G of the in-pipe-joint passage 1A. In FIG. 1, a receptacle side end surface (right end surface in FIG. 1) of the diameter changing portion 2F of the rod 2 abuts against a step portion 1I of the enlarged diameter portion 1G of the in-pipe-joint passage 1A. But, the receptacle side end surface of the diameter changing portion 2F and the step portion 1I of the enlarged diameter portion 1G of the in-pipe-joint passage 1A do not have a function as an opening/closing valve.

At a radially outer portion of the in-pipe-joint passage 1A on the receptacle side (right side in FIG. 1) is mounted a clutch 4 with a hollow cylinder shape. On an end of the clutch 4 on the hydrogen supply source side (left side in FIG. 1) is formed a locking portion 4A projecting radially inward, and the locking portion 4A engages a clutch engaging channel 1J formed on the pipe joint main body 1 to be fixed thereto. On the other hand, on an end of the clutch 4 on the receptacle side (right side in FIG. 1) is formed a swelling portion 4B swelling radially outward and inward to be a thicker portion. When the filling nozzle 10 and the receptacle 20 (FIG. 2) are connected with each other (while hydrogen is filled), a radially inner portion of the swelling portion 4B engages an engaging channel 20A of the receptacle 20 (refer to FIG. 2).

Outside the clutch 4 in a radial direction is mounted a lever 5. The lever 5 is integrally formed with a lever grasping portion 5A, and moving the lever 5 in a direction of the arrow H while grasping the lever grasping portion 5A causes an end portion of the lever 5 on the receptacle side (right side in FIG. 1) to be positioned radially outside the swelling portion 4B of the clutch 4, which can prevent the swelling portion 4B of the clutch 4 from detaching from the engaging channel 20A (FIG. 2) of the receptacle 20. Or, positioning an end portion of the lever 5 on the receptacle side at a place where the end disengaged from a radially outer portion of the swelling portion 4B of the clutch 4, for example, at a position on the hydrogen supply side (left side in FIG. 1) can allow the swelling portion 4B of the clutch 4 to be disengaged from the engaging channel 20A of the receptacle 20. More precisely, as shown in FIG. 2, in order to disconnect the filling nozzle 10 from the receptacle 20 where the filling nozzle 10 (the pipe joint main body 1) and the receptacle 20 are connected with each other, a worker grasps the lever grasping portion 5A and moves left in FIGS. 1 and 2 (on the side apart from the receptacle 20), which causes an end of the lever 5 on the receptacle side (right end portion in FIGS. 1 and 2) to move from a radially outer portion of the swelling portion 4B of the clutch 4. As a result, the swelling portion 4B of the clutch 4 becomes movable radially outwardly, and the radially outward movement of the swelling portion 4B allows the swelling portion 4B to be disengaged from the engaging channel 20A of the receptacle 20.

In FIG. 1 again, on the pipe joint main body 1 are formed a lever opening portion 1K for allowing the lever 5 to move in a direction of the allow H and a lever movement passage 1L. In addition, a crutch mechanism 12 for holding the lever 5 outside the swelling portion 4B of the clutch 4 at the connection of the filling nozzle 10 and the receptacle 20 (FIG. 2: when hydrogen is fed) will be explained below in detail.

In FIG. 2 showing a condition that the filling nozzle 10 (the pipe joint main body 1) and the receptacle 20 are connected with each other, the receptacle 20 is inserted into the receptacle insertion space 1D in the pipe joint main body 1 from the opening 1C of the pipe joint main body 1. In the condition that the filling nozzle 10 and the receptacle 20 are not connected with each other shown in FIG. 1, the projecting region TA of the rod 2 projects on the receptacle 20 side from the pipe joint middle projection 1E, but in the connected condition shown in FIG. 2, the projecting region TA of the rod 2 contacts the bottom portion 20C of the engaging recessed portion of the receptacle 20 to be pressed, and the whole rod 2 moves left (the direction separating from the receptacle 20) in FIGS. 1 and 2 from the condition shown in FIG. 1. At this time, the rod 2 moves left by the projecting amount thereof shown in FIG. 1 until an end portion (right end) of the projecting region TA on the receptacle side (refer to FIG. 1) reaches the receptacle side end portion (right end) of the pipe joint middle projection 1E.

In accordance with the left movement of the rod 2, the valve element 2A at an end of the rod 2 departs from the valve seat 1H against elastically repulsive force of the spring 3. Then, from a gap between the valve seat 1H and the valve element 2A, hydrogen gas inflows into the in-pipe-joint passage 1A. The hydrogen gas inflowing into the in-pipe-joint passage 1A is fed through the openings 2E, the in-rod passage 2B of the rod 2 and the in-receptacle passage 20B into the in-vehicle hydrogen filling tank 41 (FIG. 5) not shown in FIG. 2.

In FIG. 2, when hydrogen gas flows through the in-pipe-joint passage 1A and the in-rod passage 2B, even if there is hydrogen gas that does not flow from the openings 2E of the rod 2 to the in-rod passage 2B but flows in a gap δ1 between the outer peripheral surface of the rod large-diameter portion 2D and the inner peripheral surface of the in-pipe-joint passage 1, the hydrogen gas reaches the bottom portion 20C of the engaging recessed portion of the receptacle 20 to inflow into the in-receptacle passage 20B and not to leak outside the pipe joint main body 1. Here, on a portion where the inner peripheral surface 20D of the engaging recessed portion of the receptacle 20 contacts the outer periphery of the pipe joint middle projection 1E is mounted the receptacle side O-ring 21. Even if there is hydrogen gas that flows from the bottom portion 20C of the receptacle engaging recessed portion to a gap ε1 between the inner wall surface 20D of the receptacle engaging recessed portion and the outer peripheral surface of the pipe joint middle projection 1E, the hydrogen gas is blocked by the receptacle side O-ring 21, so that the hydrogen gas does not leak outside the pipe joint main body 1.

As it is clear from FIGS. 1 and 2, the rod 2 slides on the in-pipe-joint passage 1A, but hydrogen gas does not leak outside the pipe joint main body 1 even if no O-ring is mounted on a portion where the rod 2 slides. In addition, before the pipe joint main body 1 and the receptacle 20 contact with each other as shown in FIG. 1, the valve element 2A seats on the valve seat 1H, so that into the in-pipe-joint passage 1A does not inflow hydrogen gas, and there is no possibility that hydrogen gas leaks from the gap between the pipe joint main body 1 and the receptacle 20.

In the condition that the pipe joint main body 1 and the receptacle 20 are connected with each other shown in FIG. 2, the hydrogen gas flowing in the in-pipe-joint passage 1A flows into the in-rod passage 2B or the gap δ1 between the outer peripheral surface of the rod large-diameter portion 2D and the inner peripheral surface of the in-pipe-joint passage 1A to reach the bottom portion 20C of the receptacle engaging recessed portion and flow into the in-receptacle passage 20B, so that the hydrogen gas does not leak outside the pipe joint main body 1 and the receptacle 20. Therefore, in the first embodiment, even if no O-ring is disposed on a portion where the rod 2 slides on the in-pipe-joint passage 1A, hydrogen gas does not leak outside the pipe joint main body 1 and the receptacle 20. As a result, it is not necessary to mount an O-ring that is deteriorated by sliding the rod 2, and deterioration of the O-ring due to sliding of the rod 2 can be prevented to prevent leakage of the hydrogen gas. In addition, the number of sealing structures in the filling nozzle 10 is decreased and durability is improved.

As described above, in the first embodiment shown in FIGS. 1 and 2 also exists the clutch mechanism 12 for holding the lever 5 to prevent the swelling portion 4B of the clutch 4 from detaching from the engaging channel 20A of the receptacle 20 when the filling nozzle 10 and the receptacle 20 are connected with each other (when hydrogen is fed). But, the mechanism does not exist in FIG. 6. In FIG. 2, the clutch mechanism 12 has a function of holding a receptacle side end portion of the lever 5 outside the swelling portion 4B of the clutch 4 in a radial direction, and preventing the clutch 4 from detaching from the engaging channel 20A of the receptacle 20. Then, the clutch mechanism 12 includes the projection 5B (projection of the lever) formed on the receptacle side (right side in FIGS. 1 and 2) end portion of the lever 5 and a ring-shaped elastic member 6 (O-ring for example) disposed on the side separated from the receptacle 20 from the projection 5B of the lever 5. The projection 5B formed on the receptacle side end portion of the lever 5 projects radially inward. Then, the ring-shaped elastic member 6 fits in an elastic body channel 5C formed near the receptacle side end portion of the lever 5.

When the pipe joint main body 1 and the receptacle 20 are connected with each other as shown in FIG. 2, the valve element 2A mounted on an end of the rod 2 separates from the valve seat 1H, and the hydrogen gas inflows into the in-pipe-joint passage 1A and flows through the in-rod passage 2B and the in-receptacle passage 20B. At this time, hydrogen gas is extremely high in pressure (70 MPa for example), so that a tensile force F1 (FIG. 2) separating the pipe joint main body 1 from the receptacle 20 acts thereon. As a result that the tensile force F1 acts on the pipe joint main body 1, by an action between an inclined surface 4BA located on the side (left side in FIG. 2) that is separated from the receptacle 20 of the swelling portion 4B of the clutch 4 and an inclined surface 20AA located on the side (left side in FIG. 2) that is separated from the receptacle 20 of the receptacle engaging channel 20A, a radially outward force RO acts on the clutch 4 as a component force of the tensile force F1 to move the clutch 4 outward in a radial direction.

As shown in FIG. 3 enlarging a part F3 in FIG. 2, when the clutch 4 moves outward in a radial direction by the radially outward force RO, the elastic member 6 is squeezed in a radial direction. As a result, the end surface 4BB of the swelling portion 4B of the clutch 4 and the end surface 5BA of the projection 5B of the lever 5 abut with each other in the region FT. Since the end surface 4BB and the end surface 5BA abut with each other, the lever 5 cannot move from a condition shown in FIG. 3 in a direction (left side FIGS. 2 and 3) separating from the receptacle 20. The lever 5 does not move, so that the lever 5 continues positioning outward the swelling portion 4B of the clutch 4 in a radial direction to prevent the clutch 4 from moving outward in a radial direction. Therefore, without detaching the swelling portion 4B of the clutch 4 from the engaging channel 20A of the receptacle 20, it is prevented that the connection between the pipe joint main body 1 and the receptacle 20 is released. In addition, to exhibit action effect described above is properly designed elastic coefficient of the elastic member 6, projecting amount of the elastic member 6 to the crutch 4, projecting amount of the projection 5B of the lever 5 to the crutch 4, inclination angle of the inclined surface 4BA of the swelling portion 4B (FIGS. 2 and 3), inclination angle of the inclined surface 20AA of the receptacle engaging channel 20A (FIGS. 2 and 3), and so on.

In FIGS. 2 and 3, when filling hydrogen gas is finished and a predetermined depressurizing work is finished, the tensile force F1 resulting from high pressure of the hydrogen gas disappears. In accordance with the above, the radially outward force RO acting on the clutch 4 disappears to allow the clutch 4 to return to a radially inner position (position before hydrogen gas is filled). Since the clutch 4 returns to the radially inner position (position before hydrogen gas is filled), the ring-shaped elastic member 6 mounted adjacent to an end of the lever 5 returns to a cross-sectionally circular shape from the squeezed shape shown in FIG. 3, and the end surface 4BB of the swelling portion 4B of the clutch 4 and the end surface 5BA of the projection 5B of the lever 5 become a state that their relative positions in a radial direction (vertical position in FIG. 3) are different. So, the end surface 4BB and the end surface 5BA do not contact with each other not to become the condition like the region FT shown in FIG. 3. Therefore, the lever 5 becomes, unlike the condition shown in FIG. 3, movable in a direction (left side FIGS. 2 and 3) separating from the receptacle 20, and when the lever 5 is moved in the direction (left side FIGS. 2 and 3) separating from the receptacle 20, the lever 5 does not position outward the swelling portion 4B of the clutch 4 in a radial direction, and it becomes possible that the swelling portion 4B of the clutch 4 detaches from the engaging channel 20A of the receptacle 20. Then, the connection between the pipe joint main body 1 and the receptacle 20 can be released.

In the first embodiment shown in FIGS. 1 to 3, the clutch mechanism 12 for holding the lever 5 and preventing the clutch 4 from detaching from the engaging channel 20A of the receptacle 20 has a different structure from the lever holding mechanism 36 shown in FIG. 6, and it is unnecessary to mount the branched passage 36A branched from the in-pipe-joint passage 31A and the member 36B for sliding in the branched passage (lever holding slide member shown in FIG. 6), and to mount the O-ring 36C (lever holding O-ring) to the member. Therefore, it is prevented that the O-ring mounted on the mechanism for holding lever deteriorates to leak hydrogen gas.

With the filling device 100 shown in FIGS. 1 to 3, inside the pipe joint main body 1 of the filling nozzle 10 is slidably mounted the rod 2 having the valve element 2A at its end against the spring 3 (elastic member). While hydrogen is filled, hydrogen gas flowing in the in-pipe-joint passage 1A flows through the in-rod passage 2B and the gap δ1 between the outer peripheral surface of the rod large-diameter portion 2D and the inner peripheral surface of the in-pipe-joint passage 1A without leaking outside the pipe joint main body 1 to reach the bottom portion 20C of the receptacle engaging recessed portion and to inflow into the in-receptacle passage 20B. Therefore, it is unnecessary to mount an O-ring on a portion where the rod 2 slides in the filling nozzle 10. So, it can be prevented that the sealing structure (O-ring) deteriorates due to the slide of the rod 2.

In the first embodiment shown in FIGS. 1 to 3, at hydrogen filling operation, after one end of the rod 2 contacts the bottom portion 20C of the engaging recessed portion of the receptacle 20 (vehicle side filling port), a passage is opened to enable filling, so it is safe. In addition, in the first embodiment, on the inner peripheral surface 20D of the engaging recessed portion of the receptacle 20 is mounted a receptacle side O-ring 21 on a portion where the inner peripheral surface 20D contacts the outer periphery of the pipe joint middle projection 1E, so that while hydrogen gas is filled, the hydrogen gas is prevented from leaking from the gap ε1 between a portion where the receptacle 20 contacts the outer periphery of the pipe joint main body 1 and the outer periphery of the pipe joint main body 1.

Further, in the first embodiment, the clutch mechanism 12 for maintaining a connected state between the filling nozzle 10 and the receptacle 20 (vehicle side filling port) is mounted, and when hydrogen is filled after the filling nozzle 10 and the receptacle 20 are connected with each other, the clutch 4 squeezes the elastic member 6 in a radial direction to contact the end surface 4BB of the swelling portion 4B of the clutch 4 and the end surface 5BA of the projection 5B of the lever 5 with each other, so that the lever 5 cannot move in a direction separating from the receptacle 20. Therefore, while hydrogen is filled after the filling nozzle 10 and the receptacle 20 are connected with each other, the filling nozzle 10 cannot be detached from the receptacle 20. With the clutch mechanism 12, it is unnecessary to form the branched passage 36A shown in FIG. 6; the slide member 36B is not required to slide in the branched passage 36A; and the sealing structure (O-ring 36C) is not required to be mounted on the branched passage 36A. Therefore, there is no possibility that hydrogen gas leaks from the branched passage 36A constructing the lever holding mechanism 36 according to the conventional technique.

FIG. 4 shows the second embodiment of the present invention. A filling nozzle 11 of the second embodiment shown in FIG. 4 differs from the filling nozzle 10 of the first embodiment shown in FIGS. 1 to 3 in a clutch mechanism (lever holding mechanism). In the second embodiment are not mounted the projection 5B (projection of lever) mounted on the receptacle side (right side in FIGS. 1 and 2) end portion of the lever 5 and the ring-shaped elastic member 6 (O-ring for example) mounted on the side (left side in FIGS. 1 and 2) separating from the receptacle 20 from the projection 5B of the lever 5 like the first embodiment as shown in FIGS. 1 and 2.

The lever holding mechanism of the second embodiment is constructed as same as that shown in FIG. 6, and has a function of holding the lever 35 outward the swelling portion 34A of the clutch 34 and preventing the swelling portion 34A of the clutch 34 from detaching from the engaging channel 20A of the receptacle 20 while the filling nozzle 11 and the receptacle 20 are connected with each other. Since construction and action effect of the lever holding mechanism are the same as those of the mechanism shown in FIG. 6, repeated explanation is omitted. In addition, in FIG. 4, to members constructing the lever holding mechanism 36 are attached the same numerals as those in FIG. 6. Further, to the other members shown in FIG. 4 constructed as same as those shown in FIGS. 1 to 3 are attached the same numerals as FIGS. 1 to 3.

In the filling device 101 according to the second embodiment also, it is not required that a sealing structure is arranged on a portion where the rod 2 slides the in-pipe-joint passage 1A, so that the seal structure (O-ring) can be prevented from deterioration due to the slide of the rod 2. Therefore, leakage of hydrogen gas due to deterioration of the sealing structure (O-ring) can be prevented. Other construction and action effect in the second embodiment shown in FIG. 4 are the same as those in the first embodiment shown in FIGS. 1 to 3.

Since the embodiments shown in the drawings are merely examples, and the embodiments do not limit the technical scope of the present invention.

DESCRIPTION OF THE REFERENCE NUMERALS 1 pipe joint main body
1A in-pipe-joint passage
1B hydrogen introducing port
1C opening
1D receptacle insertion space
1E pipe joint middle projection
1F valve element accommodating portion
1G enlarged diameter portion
1H valve seat
1I step portion
1J clutch engaging channel
1K opening portion for lever
1L lever movement passage
2 rod
2A valve element
2B in-rod passage
2C small-diameter portion
2D large-diameter portion
2E openings
2F diameter measurement variation portion
3 spring
4 clutch
4A locking portion
4B swelling portion
4BA inclined surface
4BB end surface
5 lever
5A lever grasping portion
5B projection
5BA end surface 5C elastic body channel
6 elastic member (O-ring etc.)
10, 11 filling nozzles
12 clutch mechanism
20 receptacle (vehicle side filling port)
20A engaging channel
20AA inclined surface
20B in-receptacle passage
20C bottom portion
20D inner peripheral surface
21 receptacle side O-ring
30 filling nozzle
31 pipe joint
31A in-pipe-joint passage
31B valve seat
31D lever movement passage
32 rod
32A opening
32B in-rod passage
33 valve element
34 clutch
34A swelling portion
35 lever
36 lever holding mechanism
36A branched passage
36B lever holding slide member
36C lever holding O-ring
36D rod
37 nozzle side O-ring
40 receptacle
40A engaging recessed portion
40B engaging channel
40C passage
41 receptacle side O-ring
45 filling hose
47 hydrogen tank
50 hydrogen storage tank
51 piping system
60 dispenser
100, 101 filling devices
300 hydrogen filling device
A vehicle
F1 tensile force
FT space
RO force advancing to an outer side in the radial direction of rod
TA space
δ, δ1 gap
ε, ε1 gaps

The invention claimed is:

1. A filling nozzle for use with a storage tank capable of storing hydrogen fuel, the filling nozzle being configured for filling hydrogen from the storage tank through a fuel filling system to an in-vehicle hydrogen filling tank mounted on a vehicle, the filling nozzle comprising:
 a main body having an introduction port, an opening sized to receive a receptacle associated with the in-vehicle hydrogen filling tank, a fluid passageway extending from the introduction port to the opening, and a projecting member extending around a portion of the fluid passageway;
 a rod at least partially positioned within the fluid passageway of the main body;
 a valve element coupled to the rod; and
 an elastic element extending between a portion of the main body and the valve element and applying a biasing force on the valve element;
 the rod being moveable relative to the main body between a first position and a second position, in the first position, a portion of the rod extends beyond the projecting member of the main body and into the opening to define a protruding portion and the valve element closing the fluid passageway to restrict fluid flow therethrough, in the second position, at least a portion of the protruding portion is received within the projecting member and the valve element is moved to open the fluid passageway to allow fluid flow therethrough.

2. The filling nozzle recited in claim 1, wherein an outer surface of the projecting member is sized to be received in the receptacle when the receptacle is received in the opening of the main body.

3. The filling nozzle as claimed in claim 1, wherein an end of said rod is configured to be disposable in contact with the receptacle.

4. The filling nozzle as claimed in claim 1, further comprising a clutch mechanism for maintaining a connected state between the main body and the receptacle.

5. The filling nozzle as claimed in claim 3, further comprising a clutch mechanism for maintaining a connected state between the filling nozzle and the vehicle side filling port.

6. A filling device for transferring hydrogen from a storage tank to an in-vehicle hydrogen filling tank mounted on a vehicle, the filling device comprising:
 a receptacle associated with the in-vehicle hydrogen filling tank; and
 a filling nozzle comprising:
  a main body having an introduction port, an opening sized to receive the receptacle, a fluid passageway extending from the introduction port to the opening, and a projecting member extending around a portion of the fluid passageway;
  a rod at least partially positioned within the fluid passageway of the main body;
  a valve element coupled to the rod; and
  an elastic element extending between a portion of the main body and the valve element and applying a biasing force on the valve element;
  the rod being moveable relative to the main body between a first position and a second position, in the first position, a portion of the rod extends beyond the projecting member of the main body and into the opening to define a protruding portion and the valve element closing the fluid passageway to restrict fluid flow therethrough, in the second position, at least a portion of the protruding portion is received within the projecting member and the valve element is moved to open the fluid passageway to allow fluid flow therethrough.

7. The filling device recited in claim 6, wherein an outer surface of the projecting member is sized to be received in the receptacle when the receptacle is received in the opening of the main body.

8. The filling device as claimed in claim 6, wherein an end of said rod is disposable in contact with the receptacle.

9. The filling device as claimed in claim 6, wherein a sealing structure is arranged in the receptacle and is sized to receive the projecting member when the receptacle is received in the opening of the main body.

10. The filling device as claimed in claim 6, further comprising a clutch mechanism for maintaining a connected state between the main body and the receptacle.

* * * * *